(12) United States Patent
Kim (10) Patent No.: US 6,618,903 B2
(45) Date of Patent: Sep. 16, 2003

(54) HINGE DEVICE (75) Inventor: Tae-Gil Kim, Suwon-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/139,254

(22) Filed: May 7, 2002

(65) Prior Publication Data
US 2003/0097732 A1 May 29, 2003

(30) Foreign Application Priority Data
Nov. 28, 2001 (KR) .......................... 2001-74441

(51) Int. Cl.[7] .......................... E05D 11/08; E05C 17/64
(52) U.S. Cl. .......................... 16/337; 16/340
(58) Field of Search .......................... 16/337, 340, 338, 16/374, 376, 341; 403/111, 103; 361/681, 682, 683; 248/919–923

(56) References Cited

U.S. PATENT DOCUMENTS

| 2,736,027 | A | * | 2/1956 | Pamelee .......................... 2/8 |
| 5,269,047 | A | * | 12/1993 | Lu .......................... 16/340 |
| 5,772,351 | A | * | 6/1998 | Ching .......................... 403/111 |
| 5,894,633 | A | | 4/1999 | Kaneko |
| 5,913,351 | A | | 6/1999 | Miura |
| 6,081,969 | A | | 7/2000 | Tanahashi et al. |
| 6,175,990 | B1 | | 1/2001 | Kato et al. |
| 6,253,419 | B1 | * | 7/2001 | Lu .......................... 16/340 |
| 6,421,878 | B1 | * | 7/2002 | Kaneko et al. .......................... 16/330 |

FOREIGN PATENT DOCUMENTS

| JP | 10-317779 | * | 2/1998 |
| JP | 2002-185158 A | * | 6/2002 |

* cited by examiner

Primary Examiner—Chuck Y. Mah
(74) Attorney, Agent, or Firm—Robert E. Bushnell, Esq.

(57) ABSTRACT

A hinge device of a foldable electronic appliance having a sub-body rotatably mounted by the hinge device to a main body. The hinge device having a hinge shaft with one end fixedly mounted to the sub-body and a second end rotatably mounted to the main body. A fixed disk having a notch therein and a protrusion continued from the notch and extending from one face thereof, the fixed disk being in a fixed relationship to the main body. A movable disk having a protrusion extending from a face thereof to contact with the one face of the fixed disk when opening the sub-body or to engage the notch in the fixed disk when the sub-body is fully closed. A projection extending from the movable disk to limit the rotation of the hinge shaft. A spring washer for axially pressing the movable disk toward the fixed disk, and a nut for fixing the fixed disk, the movable disk and the spring washer to the second end of the hinge shaft.

24 Claims, 7 Drawing Sheets

HINGE DEVICE

CLAIM OF PRIORITY

This application makes reference to, incorporates the same herein, and claims all benefits accruing under 35 U.S.C. §119 from an application entitled HINGE DEVICE filed in the Korean Industrial Property Office on Nov. 28, 2001 and assigned Serial No. 2001-74441 by that Office.

BACKGROUND OF THE INVENTION

1. Field of the Invention

The present invention relates to a hinge device of a foldable electronic appliance having a main body and a sub-body that can be opened which is installed on the main body. In particular, the hinge device allows the sub-body to be opened and shut smoothly and allows a user to feel certain vibrations when the sub-body is opened and shut, thereby ensuring the reliability of a product to the user.

2. Description of the Related Art

Recently, various articles of electronic appliances are available due to development of electronic industries. In particular, the electronic appliances are gradually becoming smaller, leaner and lighter in order to meet demand of consumers while functions thereof are becoming more various. For the purpose of this, the industries are focusing upon high integration and downsizing of electronic function groups.

As a measure of downsizing the articles as above, some of the articles are discriminated into a main body and a sub-body, in which the main body and the sub-body are folded to overlap with each other when they are not used or are in a standby state.

Examples of foldable electronic appliances include a portable notebook computer, a portable terminal, an Internet telephone and the like. Each of the foldable appliances comprises a main body generally having a keypad assembly for data input and a sub-body having a display panel for displaying data. When the foldable appliance is not used or is carried along in an unused state, the foldable appliance is kept in a folded position wherein the sub-body overlaps the main body. Therefore, a hinge device is adopted to install the sub-body on the main body such that the sub-body can be opened and closed, and consideration of an angle of the sub-body between the opened and closed positions is taken into account when designing the hinge device.

With the hinge device as set forth above, however, there are no alternate positions between the opened and closed positions of the sub-body relative to the main body. Assembly tolerance causes the electronic appliances to have different degrees of resistance to the sub-body being closed, thereby degrading the reliability thereof. When the sub-body is fully folded on the main body, close contact may not be maintained between the sub-body and the main body in that the sub-body may move away from the main body, in response to the smallest external impact, such that the appliance may be susceptible to damage.

SUMMARY OF THE INVENTION

Accordingly the present invention has been devised to solve the foregoing problem of the related art and it is an object of the invention to provide a hinge device which is adopted to maintain a sub-body in a completely contacting relation with a main body, when closed, so as to preventan appliance from damage due to external impact.

It is another object of the invention to provide a hinge device which allows a user to feel vibrations as the sub-body is moved past predetermined angles between the fully open and fully closed positions with respect to the main body, thereby ensuring the reliability of a product.

Therefore, according to an aspect of the present invention to realize the foregoing objects, in a foldable appliance which comprises a main body, a sub-body that can be opened and closed which is installed on the main body and a hinge device for hinge coupling the main body to the sub-body. The hinge device comprises: a hinge shaft with one end mounted to the sub-body and the other end mounted to the main body, wherein the one end is fixed to play with the sub-body and the other end partially penetrates into the main body in an idle-coupling relation; a fixed disk penetrated by the hinge shaft, fixed at one face to the main body, and having at least one space and at least one protrusion continued from the space in the opposite face from the fixing face to main body; a movable disk penetrated by the other end of the hinge shaft and face-contacting with the fixed disk to rotate with the hinge shaft, and having at least one protrusion on a face contacting with the fixed disk; elastic means penetrated by the hinge shaft and axially pressing the movable disk; and fixing means for fixing the fixed disk, the movable disk and the elastic means.

Further, the inventive hinge device comprises a fixed disk fixed to the main body and a movable disk rotating in cooperation with the sub-body, in which the main body maintains a fully folded position with the sub-body when the protrusion of the movable disk settles into the space in the fixed disk. In this case, the protrusion settled into the space of the fixed disk applies a certain amount of fixing power to prevent playing so that the sub-body fully folded on the main body can maintain its position without playing under a certain amount of external impact.

Further, pressing the movable disk against the fixed disk can maintain the position of the protrusion of the movable disk settled into the space in the fixed disk. Elastic means is employed as pressing means, and examples thereof may include a compressed coil spring, a torsion spring with each end fixed to each of the main body and the sub-body, and preferably a disk spring.

A bent projection is formed on the movable disk and a stopper protrusion is formed on the main body within a rotational radius of the bent projection so that the sub-body is opened on the main body with a predetermined angle. For example, the opening angle is about 135 which is most preferable to display a display panel to a user. The stopper protrusion is formed at a position to maintain such an angle. In other words, the invention excludes necessity of providing a stopper device for supporting the sub-body.

Preferably, the inventive hinge device can be embodied on brackets comprising a sub-body bracket fixed to the sub-body and a main body bracket fixed to the main body.

Moreover, the inventive hinge device comprises at least one spacer washer interposed between each of components, e.g. the fixed disk, the movable disk, the sub-body bracket and the main body bracket, to adequately distribute space thereby maintaining smoother operation thereof.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The above and other objects, features and advantages of the present invention will become more apparent from the following detailed description when taken in cooperation with the accompanying drawings. While the following detailed description discloses specific features such as components, those specific features are presented for the purpose of assisting overall understanding of the invention, but it will be apparent to those skilled in the art that variations or modifications can be made to the specific features without departing from the scope of the invention.

Further, although the description will be made in reference to an Internet telephone in reference to the accompanying drawings, it is apparent that the invention can be applied to other electronic appliances such as a notebook computer, a foldable Personal Digital Assistant (PDA) and the like having a sub-body that can be opened which is installed on a main body.

Figure 1:
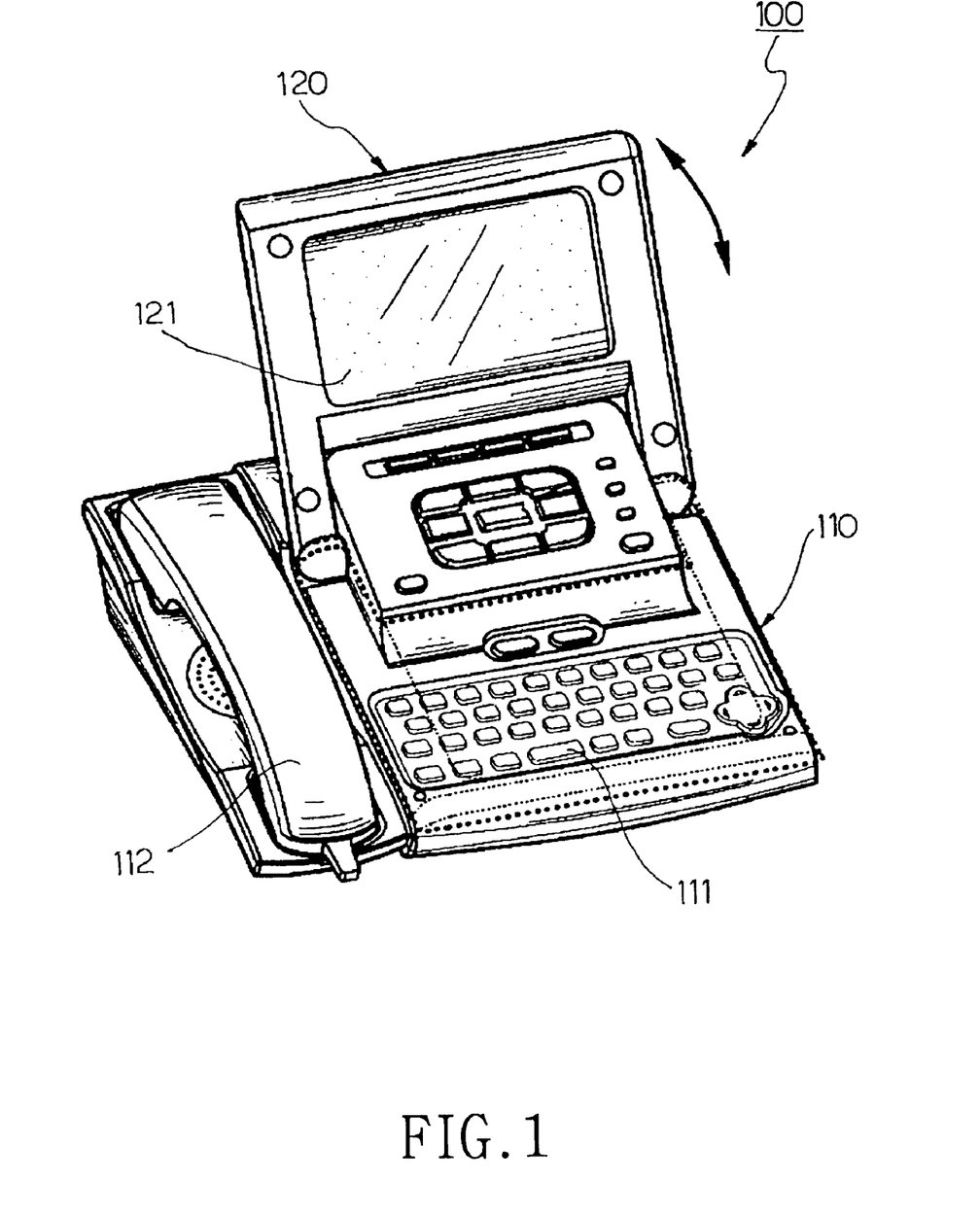
FIG. 1 is a perspective view illustrating an Internet telephone according to a preferred embodiment of the invention.
Figure 2:
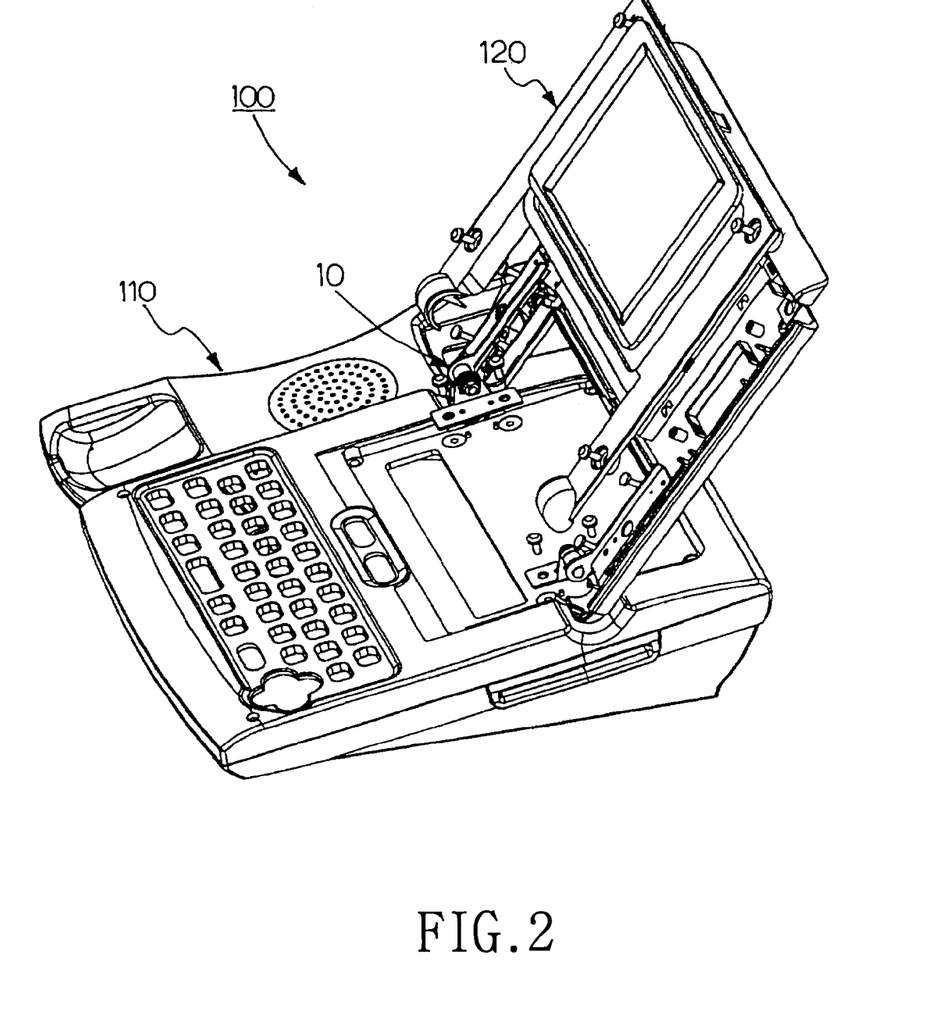
FIG. 2 is a perspective view illustrating the Internet telephone which is partially separated according to a preferred embodiment of the invention.

FIG. 1 is a perspective view illustrating an Internet telephone according to a preferred embodiment of the invention, and FIG. 2 is a perspective view of the partially separated Internet telephone according to the embodiment of the invention.

The Internet telephone 100 has a sub-body 120 that can be opened which is installed on a main body 110. The main body 110 comprises a handset 112, a keypad assembly 111 for data input and the like, and the sub-body 120 comprises a display panel 121 having an LCD module for displaying data inputted via the keypad assembly 111. In this case, the sub-body 120 employs a hinge device 10 so as to be opened for a predetermined angle at user's desire. The hinge device 10 is installed at one movable side of the sub-body 120. Alternatively, two hinge devices may be installed at both sides of the sub-body 120.

Figure 3:
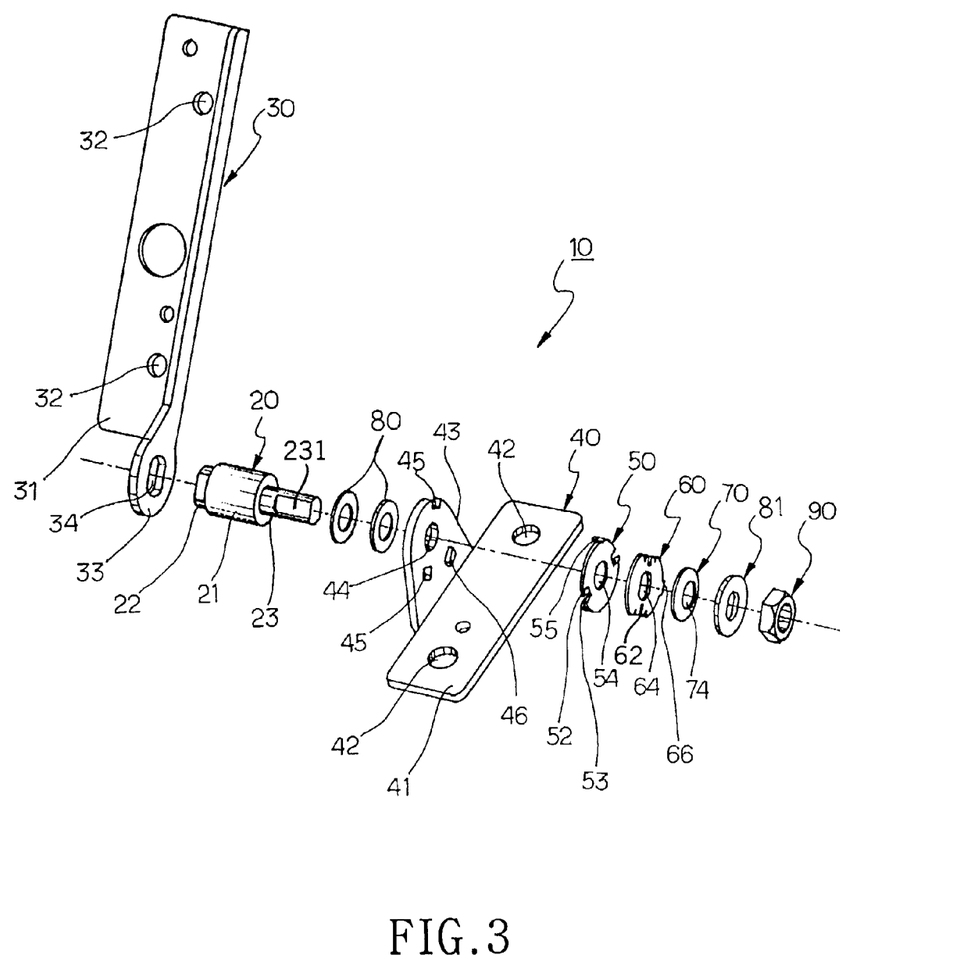
FIG. 3 is an exploded perspective view illustrating a hinge device according to the embodiment of the invention.
Figure 4:
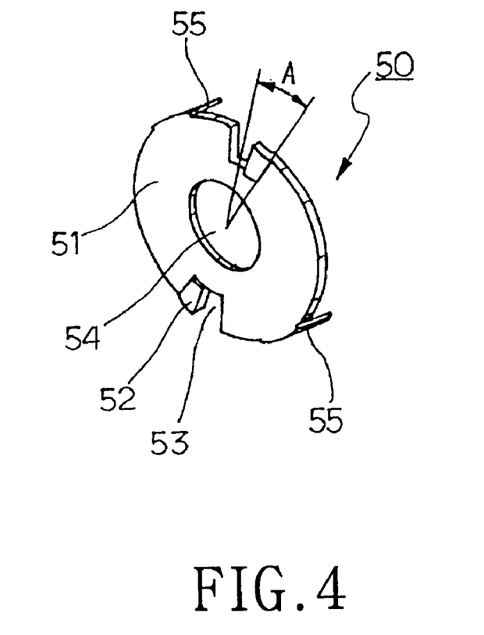
FIG. 4 is a perspective view illustrating a fixed disk of the hinge device according to the embodiment of the invention.
Figure 5:
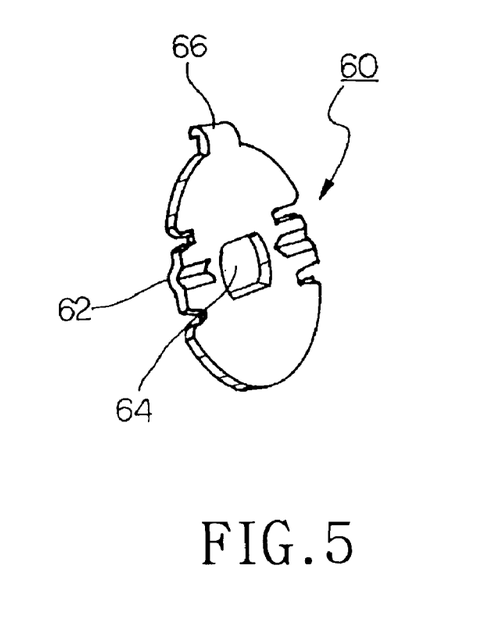
FIG. 5 is a perspective view of a movable disk of the hinge device according to the embodiment of the invention.

FIG. 3 is an exploded perspective view illustrating the hinge device according to the embodiment of the invention, FIG. 4 is a perspective view illustrating a fixed disk of the hinge device according to the embodiment of the invention, and FIG. 5 is a perspective view of a movable disk of the hinge device according to the embodiment of the invention.

The hinge device 10 comprises a sub-body bracket 30 installed on the sub-body; a main body bracket 40 installed on the main body; a hinge shaft 20 having one end 22 mounted to the sub-body bracket 30 and the other end 20 mounted to the main body bracket 40, in which the one end 22 is fixed to pivot with the sub-body bracket 30 and the other end 23 is idle-coupled into a bent plate 43 of the main body bracket 40 in a partially penetrating manner; a fixed disk 50 fixed at one face to the bent plate 43 of the main body bracket 40 as penetrated by the other end 23 of the hinge shaft 20 and having at least one space 53 (two spaces in FIG. 4) and at least one protrusion 52 (two protrusions in FIG. 4) continued from the notches 53 in another face opposite to the face contacting with bent plate 43; a movable disk 60 in a face-contacting relation with the fixed disk 50 as penetrated by the other end 23 of the hinge shaft 20 having at least one protrusion 62 (two protrusions in FIG. 5) on a face contacting with the fixed disk 50; a spring washer 70 installed for axially pressing the movable disk; a guide washer 81 contacting one side of the spring washer 70 and nut 90 for fixing the fixed disk 50, the movable disk 60, the spring washer 70 and the guide washer 81 to the other end 23 of the hinge shaft 20 penetrated there through. Alternatively, instead of spring washer 70, a compressed coil spring or a torsion spring with ends respectively fixed to the main body and the sub-body may be used.

The sub-body bracket 30 includes a fixed plate 31 having at least one screw-fastening hole 32 for fixing the sub-body bracket 30 at a proper position of the sub-body and a hinge arm 33 projected from the fixed plate 31. On the hinge arm 33, is formed a shaft fixing hole 34 into which the one end 22 of the hinge shaft 20 can be fixed. For example, the section of the one end 22 of the hinge shaft 20 is formed into the shape of an elongated hole rather than a circle. Also, the shaft fixing hole 34 of the hinge arm 33 has a structure corresponding to the one end 22 of the hinge shaft 20. Then, the hinge shaft 20 with the one end 22 inserted into the shaft fixing hole 34 can pivot together with the sub-body when the sub-body is opened or closed.

Also the main body bracket 40 has at least one fixing hole 42 on a fixed plate 41, perpendicularly extending from bent plate 43, so as to be fixed on the main body. The bent plate 43 perpendicularly extending from one side of the fixed plate 41 and has a shaft through-hole 44 through which the other end 23 of the hinge shaft 20 is inserted to rotate idly therein. The sub-body bracket 30 and the main body bracket 40 are fixed on the sub-body and the main body, respectively, so that the shaft through-hole 44 is aligned axially with the shaft fixing hole 34 in the hinge arm 33 of the sub-body bracket 30. Therefore, the outer periphery or a portion of the hinge shaft 20 contacting with the inner periphery of the shaft through-hole 44 in the bent plate 43 can have a circular cross-section.

At least one fixing groove 45 (two grooves in FIG. 3) is formed in bent plate 43 into which at least one projection 55 (two projections in FIG. 4) extending from the fixed disk 50 is inserted. Fixed disk 50 has a circular shaft through-hole 54 through which the other end 23 of hinge shaft 20 passes enabling the hinge shaft 20 to rotate as the main body bracket 40 and fixed disk 50 remain stationary.

The bent plate 43 has a stopper protrusion 46 at a proper position to restrict an angle of rotation of the movable disk 60 which is installed to rotate together with the hinge shaft 20. Therefore, the movable disk 60 is provided at a proper position in the outer periphery with a projection 66 bent toward the bent plate 43 and over the outer periphery of fixed disk 50. Movable disk 60 includes a shaft through-hole 64 which engages the other end 23 of hinge shaft 20, wherein the other end 23 has a cross section matching the shape of the shaft through-hole 64. In the illustrated embodiment, the other end 23 has on flattened side 231, but preferably has two diametrically opposing flatted sides 231.

When the sub-body 120 is opened hinge shaft 20 rotates in cooperation with sub-body bracket 30. Simultaneously, movable disk 60 rotates in cooperation with the other end 23 of hinge shaft 20 until projection 66 engages stopper protrusion 46.

In order to have the foregoing configuration, the hinge shaft 20 has one end 22 and the other end 23 extended from the both ends of a circular-sectional hinge shaft body 21. The shafts 22 and 23 extended from the both ends have diameters smaller than that of the hinge shaft body 21 so as to restrict degree of insertion of the one end 22 of the hinge shaft 20 which is fixedly inserted into the shaft fixing hole 34 of the hinge arm 33, and in the same manner, restriction can be made to degree of penetration of the other end 23 into the through-hole 44 which is formed in the bent plate 43 of the main body bracket 40. To further restrict the degree of penetration of the other end 23, one or more spacer washers 80 may provided between hinge shaft body 21 and bent plate 43. Washers 80 can take a number of forms, such as, spring washers, flat washers, friction washers, or any combination thereof.

The fixed disk, as shown in FIG. 4, can have the form of a circular disk with the circular shaft through-hole 54 in the center through which the other end 23 of the hinge shaft 20 penetrates. Further, the fixed disk 50 is provided with the notches 53 and the upwardly extended protrusions 52 connected to the notches 53. The protrusions 52 can be integrally formed a die stamping process, or embossing, when the fixed disk 50 is formed. Further, the protrusions 52 are formed on the face 51 opposite to the mounting direction of the fixed disk 50 to the hinge shaft 20. The notches 53 can be opened in the direction of the outer periphery of the fixed disk 50, or formed on the face 51 of the fixed disk 50. Alternatively, the notches 53 can be provided as a through-hole, a blind hole, or detent. For example, the notches 53 can be provided into any form which is recessed from the disk plane of face 51.

As described previously, the fixed disk 50 is provided with the projections 55 projecting, at its outer periphery, in the direction of the bent plate 43 of the main body bracket 40 with the projections 55 being separated by a predetermined interval. The projections 55 are inserted into the fixing grooves 45 on the bent plate 43 to prevent the fixed disk 50 from rotating together with the hinge shaft 20. As will be described hereinafter, an angle (A in FIG. 4) from the protrusions 52 of the fixed disk 50 to a central portion of the notches 53 can be about 15°. When the sub-body 120 is shut on the main body 110, the sub-body 120 is completely shut by pivoting the hinge 10 through the angle A after pivoting f the hinge 10 or a certain angle. In this case, the protrusions 52 allow a user to feel when protrusions 62 contact protrusions 52 after pivoting the hinge 10 through the above mentioned certain angle from the open position, and feel when protrusions 62 align with notches 53 after further rotation of hinge 10 through the above mentioned angle A to the completely shut position. The sub-body 120 will be maintain in the completely shut position unless enough force is applied to move protrusion 62 past protrusion 52, such force being determined by the elastic force of spring washer 70 being exerted on movable disk 60 and the shape of protrusions 52 and 62. This prevents that the sub-body 120 of the appliance from being accidentally opened under slight external impact while the appliance is carried along.

The movable disk 60, installed in a face-contacting manner with the fixed disk 50 can be formed into a circular disk, as shown in FIG. 5, with the through-hole 64 in the center into which the other end 23 of the shaft can penetrate. In this case, the through-hole 64 is adapted to rotate with the hinge shaft 20 after the hinge shaft 20 penetrates into the through-hole 64. Further, the movable disk 60 is provided on one face with the protrusions 62 projected from the face. The protrusions 62 are formed on the face adjacent to the fixed disk 50. Further, when forming the movable disk 60, the protrusions 62 can be integrally formed with the movable disk 60 by a die stamping process, or embossing. Therefore, when the movable disk 60 rotates in cooperation with the hinge shaft 20 which rotates with the sub-body 120, the movement of protrusions 62 of the movable disk 60 is interfered with by the protrusions 52 formed on the fixed disk 50. By the user applying a little extra closing force to sub-body 120, the elastic force of spring washer 70 will be overcome enabling protrusions 62 to ride over protrusions 52 and settle into notches 53, thereby placing sub-body 120 in the fully closed position. In other words, the time point that the protrusions 62 of the movable disk 60 completely settle in the notches 53 of the fixed disk 50 is the same as the time point that the sub-body 120 is completely shut on the main body 110.

Figure 7:
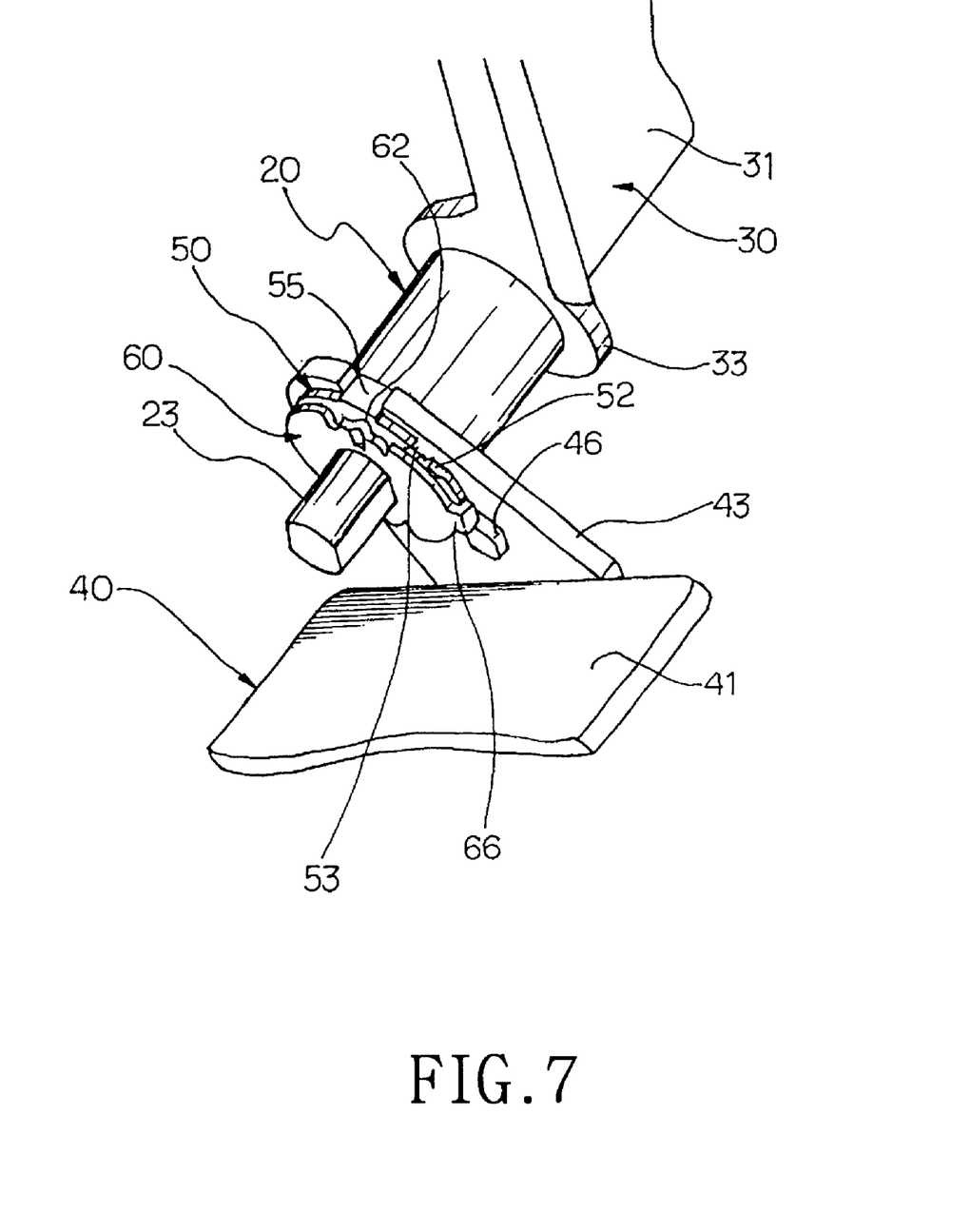
FIG. 7 is a perspective view illustrating the movable disk which is restricted in rotation by stopper protrusion of the main body bracket according to the embodiment of the invention.

Further, at a proper position on the outer periphery of the movable disk 60, is formed the bent projection 66 which is bent toward the bent plate 43 of the main body bracket 40. The bent projection 66 is installed at a position that can be restricted by the stopper protrusion 46, as shown in FIG. 7, which is formed on the bent plate 43 of the foregoing main body bracket 40 when the sub-body is in the fully open position. Thus, the bent projection 66 of the movable disk 60 is provided at a position restricting the sub-body 120 at a time point that the sub-body 120 is opened on the main body 110 at a position allowing the user good view of display panel 121.

Figure 8:
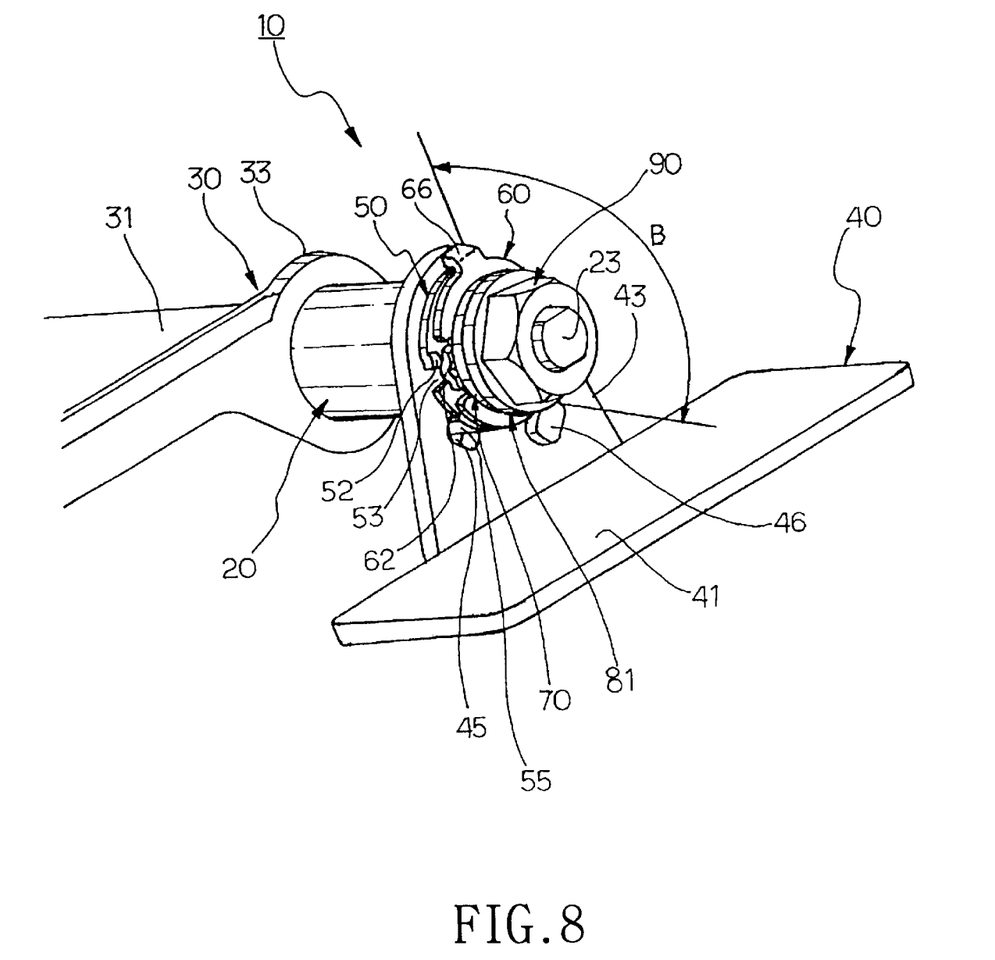
FIG. 8 is a perspective view illustrating the hinge device which is assembled according to the preferred embodiment of the invention.

FIG. 8 illustrates the position of the movable disk 60 where the sub-body 120 is completely shut on the main body 110, in which an angle B between the bent projection 66 of the movable disk 60 and the stopper protrusion 46 in the bent plate 43 of the main body bracket 40 indicates an angle between the opened and shut positions of the sub-body 120 on the main body 110. Preferably, the angle B is maintained at about 135°.

In the embodiment of the invention, for example, at least one spacer washer 80 and guide washer 81 are utilized to adequately distribute space so that the operations of the foregoing components can be maintained more smoothly.

After installing the foregoing components to the hinge shaft 20, the nut 90 is screwed into the end of the hinge shaft. After the nut is screwed, a calking can be performed in order to securely fix the position of the nut.

Hereinafter assembled relationship among the foregoing components will be described in reference to the accompanying drawings.

Figure 6:
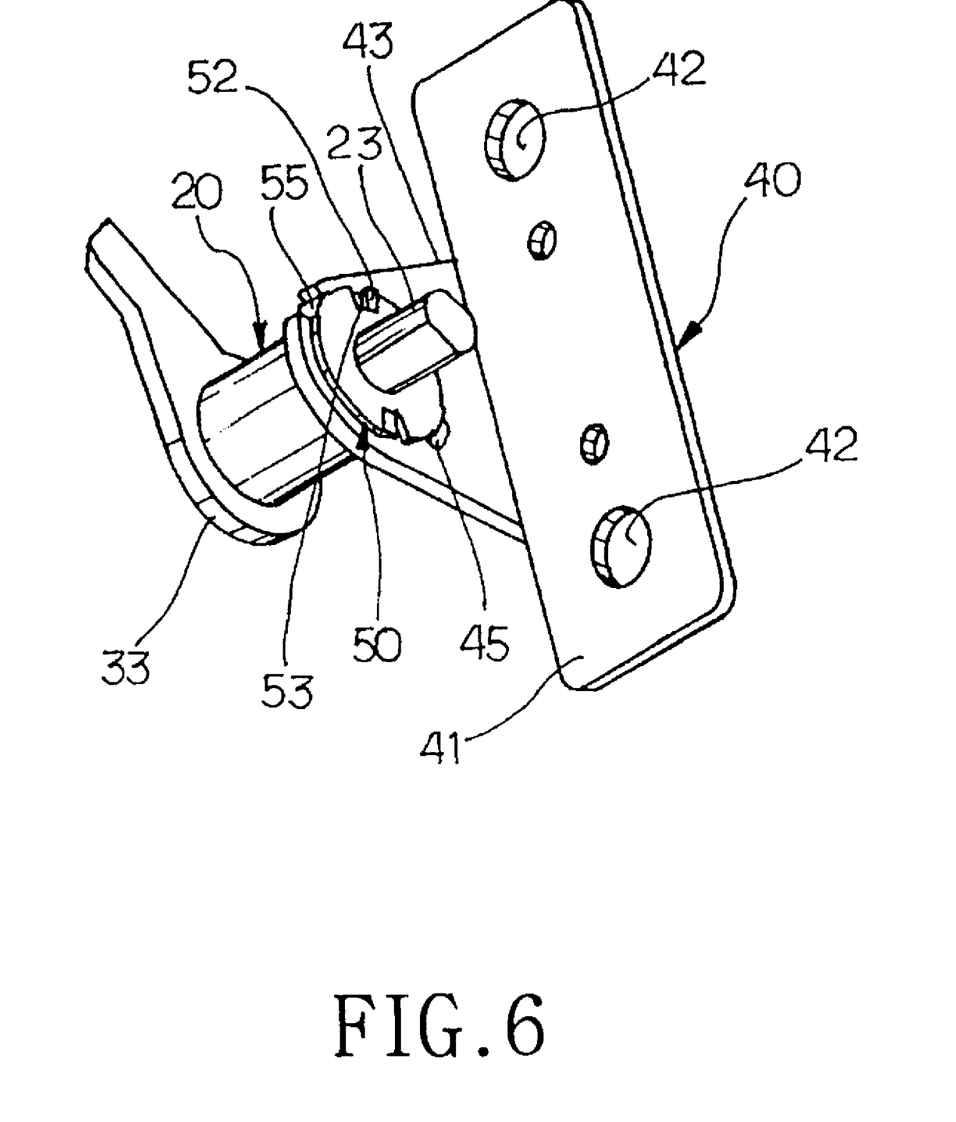
FIG. 6 is a perspective view illustrating the fixed disk mounted to a hinge shaft and a main body bracket according to the embodiment of the invention.

FIG. 6 is a perspective view illustrating the fixed disk mounted to the hinge shaft and the main body bracket according to the embodiment of the invention, and FIG. 7 is a perspective view illustrating the movable disk which is restricted in rotation by the stopper protrusion of the main body bracket according to the invention.

The one end 22 of the hinge shaft 20 is inserted into the shaft fixing hole 34 in the hinge arm 33 of the sub-body bracket 30 so as to rotate in cooperation with the sub-body 120. The other end 23 of the hinge shaft 20 penetrates through the shaft through-hole 44 formed in the bent plate 43 of the main body bracket 40. At this time, the washer 80 can be interposed between the hinge shaft 20 and the bent plate 43.

Then, the shaft through-hole 54 of fixed disk 50 is installed over the other end 23 of the hinge shaft 20 projecting from the through-hole 44 of the bent plate 43. The projections 55 of the fixed disk 50 are inserted into the fixing grooves 45 in the bent plate 43 so that the fixed disk 50 does not rotate in cooperation with hinge shaft 20. Preferably, the two projections 55 are provided as diametrically opposed in the fixed disk 50, and the two fixing grooves 45 are formed in the positions of the bent plate 43 corresponding to the projections 55.

As shown in FIG. 7, the shaft through-hole 64 of movable disk 60 is installed over the other end 23 of hinge shaft 20 to contact with the fixed disk 50 and to rotate with the hinge shaft 20. This allows the movable disk 60 to rotate in cooperation with the sub-body 120 in the opening and closing operations thereof. The shape of the other end 23 of hinge shaft 20 and the shape of shaft through-hole 64 ensure that the movable disk is properly positioned on hinge shaft 20, with the user making sure that projection 66 is properly positioned with respect to stopper protrusion 46. Accordingly, when the sub-body 120 rotates to the fully open position, the movable disk 60 rotates while protrusions 62 move along the face 51 of fixed disk 50, which is in a fixed relation to the main body 110 and thus does not rotate, until the projection 66 of the movable disk 60 is restrained by the stopper protrusion 46 on the bent plate 43 of the main body bracket 40. When the protrusion 66 is restrained by the stopper protrusion 46, the sub-body 120 is fully opened on the main body 110.

FIG. 8 is a perspective view illustrating the assembled hinge device according to the preferred embodiment of the invention, and illustrates the position of the hinge components when the sub-body 120 is in the fully closed position with respect to the main body 110. After the movable disk 60 is mounted, the spring washer 70 is mounted to press the movable disk 60 against the fixed disk 50. The spring washer 70 has a shaft through-hole 74 through which the hinge shaft 20 penetrates. Then, the guide washer 81 is mounted to support and guide the spring washer 70 followed by screwing the nut 90 around the hinge shaft 20 to complete assembly.

According to the invention as described hereinbefore, the hinge device functions as connecting means between the main body and the sub-body so that the user can feel when the sub-body is moved to the fully closed position. When fully folded in the closed position, the sub-body is not accidentally opened even under slight external impact, thereby preventing the appliance from being damaged.

While the preferred embodiment of the present invention has been disclosed in the foregoing detailed description, a plurality of variations can be made without departing from the scope and spirit of the invention. For example, the face 51 of fixed disk 50 could include a plurality of grooves radially positioned around shaft through-hole 54 and extending to the edge of the periphery of fixed disk 50, thereby permitting the sub-body 120 to be positioned at varies degrees with respect to the main body 110 allowing the user to set the viewing angle to view display panel 121 to alternate positions. In this case, protrusions 62 of movable disk 60 would engage such grooves to hold the sub-body 120 at the selected position, and the vibrations generated by the protrusions 62 sliding over such grooves would be slight as compared to the vibration generated by the protrusions 62 sliding over protrusions 52. Therefore, it should be understood that the scope of the invention is not restricted to the foregoing preferred embodiment but will be defined by the accompanying claims and equivalents thereof.

What is claimed is:

1. In a foldable appliance which comprises a main body, a sub-body that can be opened and closed which is installed on the main body and a hinge device for hinge coupling the sub-body to the main body, the hinge device comprising:

a hinge shaft with one end mounted to the sub-body and the other end mounted to the main body, wherein said one end is in a fixed relationship to the sub-body and said other end rotates with respect to the main body;

a fixed disk, penetrated by said other end of said hinge shaft, having at least one notch therein and at least one protrusion, continued from said notch, extending from one face thereof, said fixed disk being in a fixed relationship to the main body, a movable disk having a shaft through-hole penetrated by said other end of said hinge shaft, said shaft through-hole having a shape corresponding to a shape of a portion of said other end of said hinge shaft to enable said movable disk to rotate when said hinge shaft is rotated, said movable disk having at least one protrusion extending from a face thereof to contact with said one face of said fixed disk;

elastic means penetrated by said other end of said hinge shaft, said elastic means contacting another face of said movable disk to axially press said movable disk toward said fixed disk; and fixing means for fixing said fixed disk, said movable disk and said elastic means to said other end of said hinge shaft.

2. The hinge device according to claim 1, wherein said protrusion of said movable disk rides over said protrusion of said fixed disk to settle into said notch when the sub-body is fully folded into a closed position on the main body.

3. The hinge device according to claim 1, wherein a central portion of said notch of said fixed disk has an angle of about 15° from a point where said protrusion of said movable disk first contacts said protrusion of said fixed disk when said sub-body is moved toward a fully closed position from a fully open position.

4. The hinge device according to claim 1, further comprising stopper means for preventing further opening of the sub-body after said sub-body is opened to a predetermined angle with respect to the main body.

5. The hinge device according to claim 4, wherein said predetermined angle is about 135°.

6. The hinge device according to claim 4, wherein said stopper means comprises:

a main body bracket having a fixed plate mounted to the main body and a bent projection perpendicularly projected from an outer periphery of said fixed plate; and a stopper protrusion perpendicularly projected at a predetermined position from said bent projection to restrict a rotational angle of said movable disk to limit said sub-body to a fully open position corresponding to said predetermined angle.

7. The hinge device according to claim 6, wherein said predetermined angle is about 135°.

8. The hinge device according to claim 6, wherein said movable disk includes a projection extending from an outer periphery of said movable disk and bent over said fixed disk towards said bent plate, said projection being stopped by said stopper protrusion, when opening said sub-body, to stop said sub-body at said fully open position.

9. The hinge device according to claim 6, further comprising at least one spacer washer mounted between said hinge shaft and the bent plate.

10. The hinge device according to claim 1, wherein said elastic means is a spring washer which is penetrated by said other end of said hinge shaft, said spring washer being in contact with said another face of said movable disk to increase a contact force between said movable disk and said fixed disk.

11. The hinge device according to claim 1, further comprising a guide washer interposed between said elastic means and said fixing means for axially guiding said elastic means.

12. The hinge device according to claim 1, wherein said fixing means is a nut screwed onto an end of said other end of said hinge shaft.

13. The hinge device according to claim 1, further comprising a sub-body bracket having a fixed plate and a hinge arm, said fixed plate being mounted to said sub-body and said hinge arm having a shaft fixing hole into which said one end of said hinge shaft is mounted.

14. The hinge device according to claim 1, wherein said shaft fixing hole has a non-circular shape corresponding to a non-circular shape of said one end of said hinge shaft.

15. The hinge device according to claim 1, wherein said one end of said hinge shaft and said other end of said hinge shaft are separated by a circular center section of said hinge shaft, said circular center section having a diameter larger that a diameter of either of said one end or said other end of said hinge shaft.

16. In a foldable appliance which comprises a main body, a sub-body that can be opened which is installed on the main body and a hinge device for hinge coupling the main body into the sub-body, the hinge device comprising:

a sub-body bracket having a first fixed plate mounted to the sub-body and having a hinge arm, said hinge arm including a shaft fixing hole having a non-circular shape;

a main body bracket having a second fixed plate mounted to the main body and having a bent plate perpendicularly extending from said second fixed plate, said bent plate including:
a circular shaft through-hole axially aligned with said shaft fixing hole;
at least one fixing notch; and
a stopper protrusion;

a hinge shaft having a first end mounted through said shaft fixing hole and a second end rotatably mounted to said bent plate by passing through said circular shaft through-hole;

a fixed disk having a circular shaft through-hole penetrated by second end of said hinge shaft, said fixed disk comprising:
at least one projection for engaging said at least one fixing notch;
a first face in contact with a face of said bent plate;
at least one seating notch; and
at least one protrusion continued from said at least one seating notch and extending from a second face of fixed disk;

a movable disk having a non-circular shaft through-hole penetrated by said second end of said hinge shaft; said movable disk comprising:
a projection extending from an outer periphery of said movable disk for contacting said stopper protrusion when said sub-body in opened to a fully open position;
a first face; and
at least one protrusion extending from said first face, said at least one protrusion being in contact with said second face of said fixed disk when opening said sub-body and being set in said at least one seating notch when said sub-body is in a fully closed position;

elastic means having a circular through-hole penetrated by second end of said hinge shaft and having contact with a second face of said movable disk, said elastic means axially pressing said movable disk toward said fixed disk; and fixing means mountable on said second end of said hinge shaft for fixing said fixed disk, said movable disk and said elastic means to said hinge shaft.

17. The hinge device according to claim 16, wherein said at least one protrusion of said movable disk rides over said at least one protrusion of said fixed disk to settle into said seating notch when the sub-body is folded to said fully closed position from an open position on the main body.

18. The hinge device according to claim 17, wherein a central portion of said seating notch of said fixed disk has an angle of about 15° from a point where said protrusion of said movable disk initially contacts said protrusion of said fixed disk when the sub-body is folded to said fully closed position from an open position on the main body.

19. The hinge device according to claim 16, wherein said projection of said movable disk engages said stopper protrusion of said bent plate when said sub-body is opened to a predetermined angle with respect to said main body.

20. The hinge device according to claim 19, wherein said predetermined angle is about 135°.

21. The hinge device according to claim 16, further comprising at least one spacer washer mounted between said hinge shaft and said bent plate.

22. The hinge device according to claim 16, wherein said elastic means is a spring washer.

23. The hinge device according to claim 22, further comprising a guide washer interposed between said spring washer and said fixing means for axially guiding said spring washer.

24. The hinge device according to claim 16, wherein said fixing means is a nut screwed into said second end of said hinge shaft.

* * * * *